US007350693B2

(12) United States Patent
Roper

(10) Patent No.: US 7,350,693 B2
(45) Date of Patent: Apr. 1, 2008

(54) INDEXING MECHANISM

(75) Inventor: Ronald Gordon Roper, Bedfordshire (GB)

(73) Assignee: Elster Metering Limited, Bedfordshire (GB)

( * ) Notice: Subject to any disclaimer, the term of this patent is extended or adjusted under 35 U.S.C. 154(b) by 495 days.

(21) Appl. No.: 10/495,801

(22) PCT Filed: Nov. 14, 2002

(86) PCT No.: PCT/GB02/05122

§ 371 (c)(1),
(2), (4) Date: Nov. 4, 2004

(87) PCT Pub. No.: WO03/042917

PCT Pub. Date: May 22, 2003

(65) Prior Publication Data

US 2005/0061868 A1 Mar. 24, 2005

(30) Foreign Application Priority Data

Nov. 14, 2001 (GB) ................................ 0127357.2

(51) Int. Cl.
*G06F 17/60* (2006.01)

(52) U.S. Cl. ...................... 235/103; 235/133; 235/134; 235/462.36

(58) Field of Classification Search ................ 235/103, 235/133, 134, 462.36
See application file for complete search history.

(56) References Cited

U.S. PATENT DOCUMENTS 3,931,705 A * 1/1976 Iwaki et al. ................ 368/222
4,307,291 A * 12/1981 Gloviak et al. ........... 235/95 R
5,026,973 A * 6/1991 Woodroffe .................. 235/136
5,168,146 A * 12/1992 Marshall et al. ........ 235/133 R
5,742,042 A * 4/1998 Scofield ................ 235/462.36

* cited by examiner

*Primary Examiner*—Michael G. Lee
*Assistant Examiner*—Allyson N Trail
(74) *Attorney, Agent, or Firm*—Hodgson Russ LLP

(57) ABSTRACT

An indexing mechanism comprising a body (10) mounted so as to be rotatble about an axis; means (3) for rotating said body about said axis; first cam means (9, 10) for displacing said body along said axis away from an axial rest position during rotation of said body in a first direction; biassing means (11) for restoring the body to its axial rest position on completion of a rotation or a predetermined portion thereof of the body; means (8*a*) for detecting the axial movement of the body when it is being restored to its axial rest position; and second cam means (2, 9) permitting said body to be rotated in a second direction opposite the first direction.

28 Claims, 12 Drawing Sheets

INDEXING MECHANISM

The present invention relates to indexing mechanisms, in particular suitable for use in meters (e.g. for measuring the supply of water, gas or electricity) or odometers and other counting devices.

WO 89/05016 discloses a number wheel counter in which a worm gear engages a worm wheel connected to a number wheel. Rotation of the worm gear about its longitudinal axis effects rotation of the worm wheel and thereby rotation of the number wheel. However, a cam means is provided for displacing the worm gear axially away from a rest position in synchronism with rotation of the worm gear such that the worm wheel remains stationary over a worm gear rotation corresponding to a number interval of the number wheel. At the end of a rotation the worm gear is rapidly restored to its rest position by means of a lever arrangement including a spring so as to drive the number wheel through a number interval. As a result, during almost the entire rotation of the worm gear the number wheel remains stationary enabling unambiguous readout, and only at the end of a rotation of the worm gear the readout changes.

Whilst this wheel counter works reliably in many applications it has been appreciated by the present inventor that, whilst in its rest position the worm gear of this known device cannot be rotated in reverse. Merely before completion of a full rotation of the worm gear this (incomplete) rotational movement can be reversed, but no further reverse rotational movement is possible once the worm gear has been reversed to the rest position. Hence, if the worm gear in this device is forced in the reverse direction the cam means will jam, and the device will break.

The present inventor has further appreciated that the arrangement disclosed in the above publication requires a relatively high input torque to overcome the friction between the rotating worm gear and the lever.

The present invention seeks to address these problems. Preferred embodiments of the present invention include an indexing mechanism which counts both in forward and reverse directions, and one that counts in the forward direction, regardless of the rotational direction of the input. The inventor has further appreciated that the underlying principle of the present invention can also be employed in an indexing mechanism which is read out e.g. electronically.

In one aspect the present invention provides an indexing mechanism comprising

- a body (10, 10A, 10B, 10C) mounted so as to be rotatable about an axis;
- means (3) for rotating said body about said axis;
- first cam means (9, 9C, 10, 10A, 10B, 10C) for displacing said body along said axis away from an axial rest position during rotation of said body in a first direction;
- biassing means (11) for restoring the body to its axial rest position on completion of a rotation or a predetermined portion thereof of the body;
- means for detecting the axial movement of the body when it is being restored to its axial rest position; and
- second cam means (2, 9, 2A, 9B, 2C) permitting said body to be rotated in a second direction opposite the first direction.

In a second aspect the present invention provides an indexing mechanism comprising

- a body (10, 10A, 10B, 10C) mounted so as to be rotatable about an axis;
- means (3) for rotating said body about said axis;
- first cam means (9, 9C, 10, 10A, 10B, 10C) for displacing said body along said axis away from an axial rest position during rotation of said body in a first direction;
- a spring (11), preferably a compressive spring, located coaxially with said body and for restoring the body to its axial rest position on completion of a rotation or a predetermined portion thereof of the body;
- means for detecting the axial movement of the body when it is being restored to its axial rest position; and
- means for permitting said body to be rotated in a second direction opposite the first direction.

In those embodiments in which the axial displacement is detected by means other than a wheel the rotational input movement may be translated into a "sawtooth" or similar stepwise movement along the axis. As the axial movement of the body, when it is being restored to its axial rest position, depends on fixed parameters, in particular the module of the biassing means (e.g. a compressive spring) and not on the input rotational speed this axial movement towards the rest position can be detected with higher accuracy than may be possible in arrangements in which the input rotational movement is detected directly, especially at low input rotational speeds.

Preferred features are set out in the dependent claims.

The invention also provides a meter or other counting device comprising an indexing mechanism as set forth above.

Preferred features of the present invention will now be described, by way of example only, with reference to the accompanying drawings, in which:—

in FIGS. 16, 18 and 21 these are shown partly cut-away.

Figure 1:
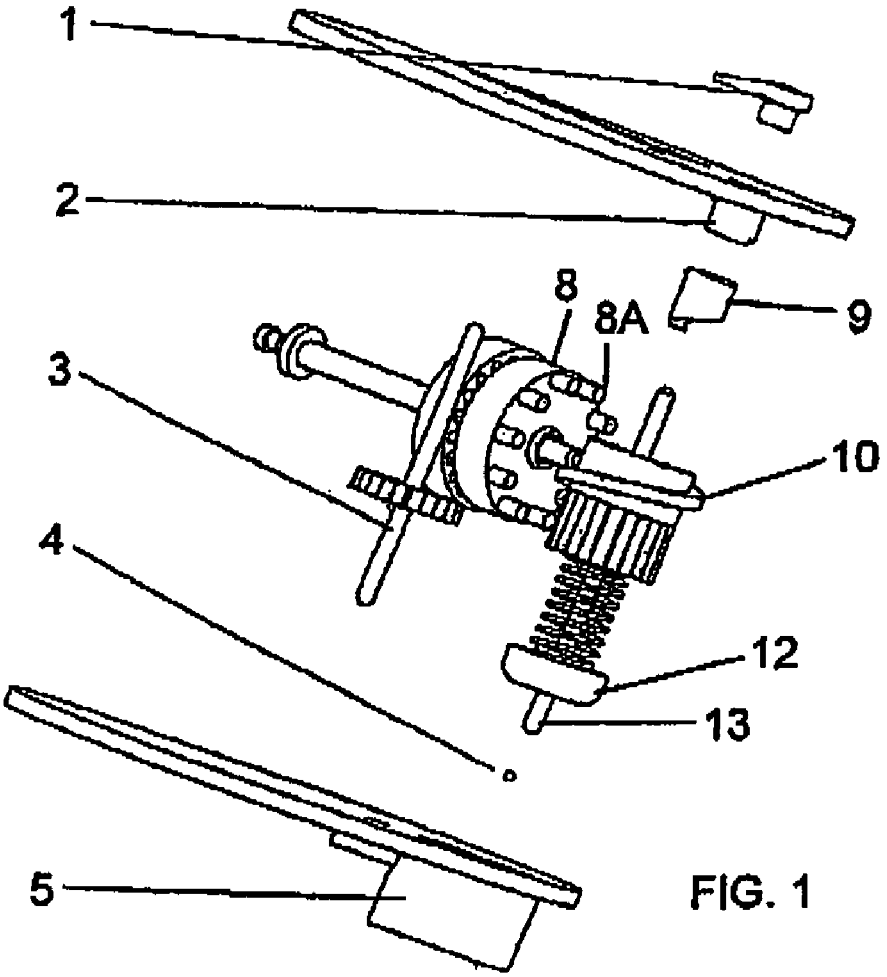
FIG. 1 shows an exploded, three-dimensional view of an indexing mechanism according to a first embodiment of the present invention.
Figure 2:
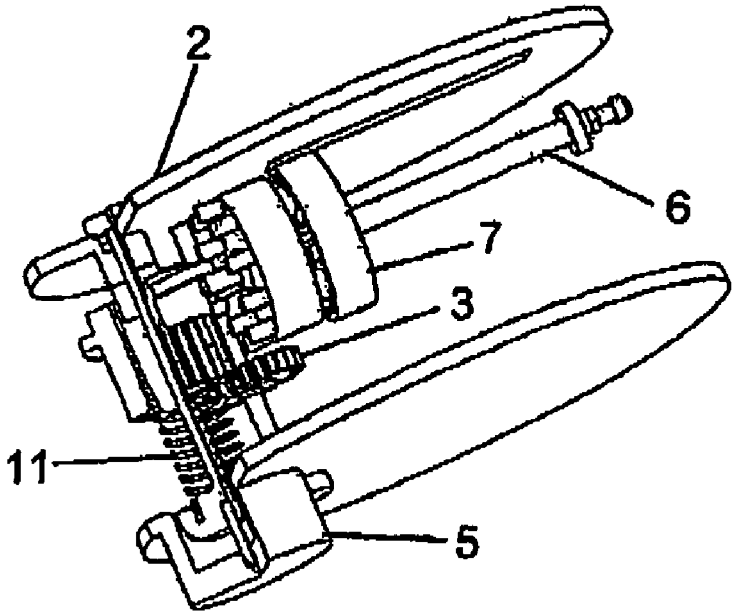
FIG. 2 shows a three-dimensional view of the indexing mechanism of the first embodiment, partly cut-away.
Figure 3:
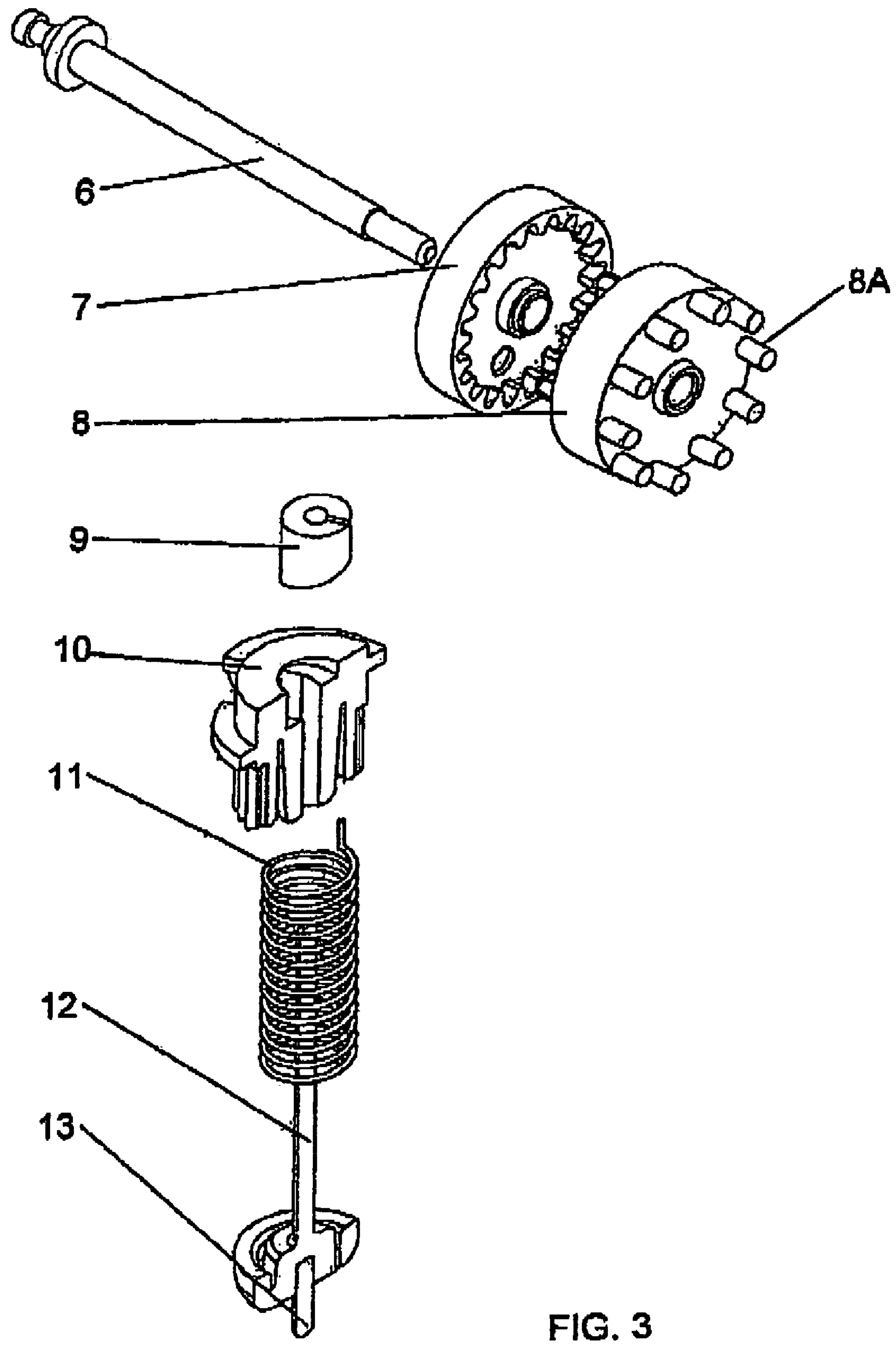
FIG. 3 shows an exploded, three-dimensional view of some parts of the embodiment shown in FIGS. 1 and 2.
Figure 4:
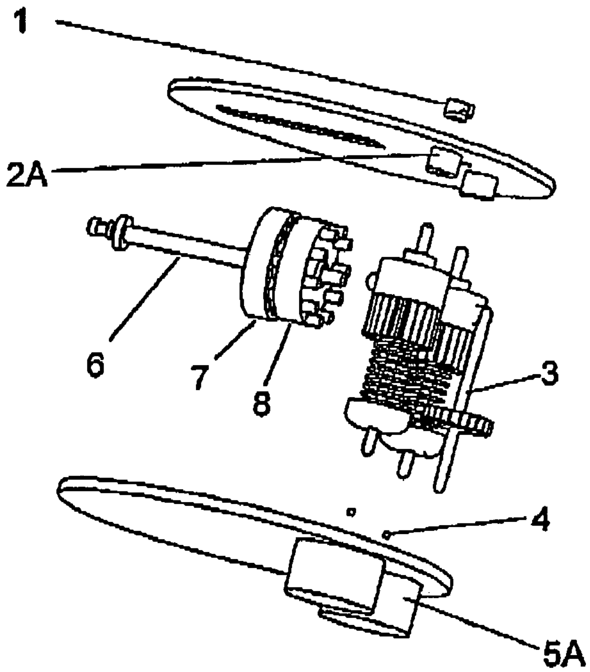
FIG. 4 shows an exploded, three-dimensional view of an indexing mechanism according to a second embodiment of the present invention.
Figure 5:
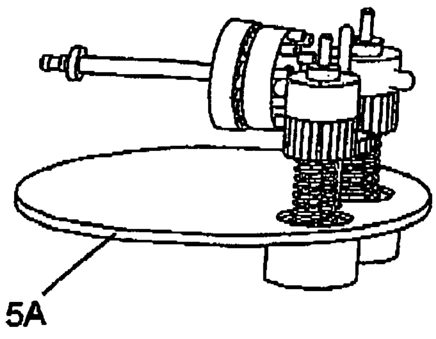
FIG. 5 shows a three-dimensional view of the indexing mechanism according to the second embodiment, with the upper bearing plate removed.
Figure 6:
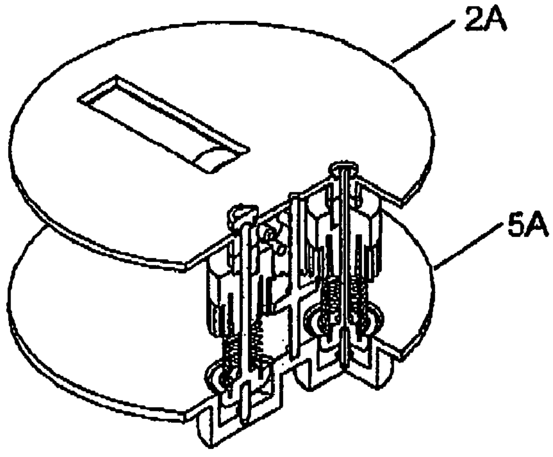
FIG. 6 shows a three-dimensional view of the indexing mechanism shown in FIGS. 4 and 5, partly cut-away.
Figure 7:
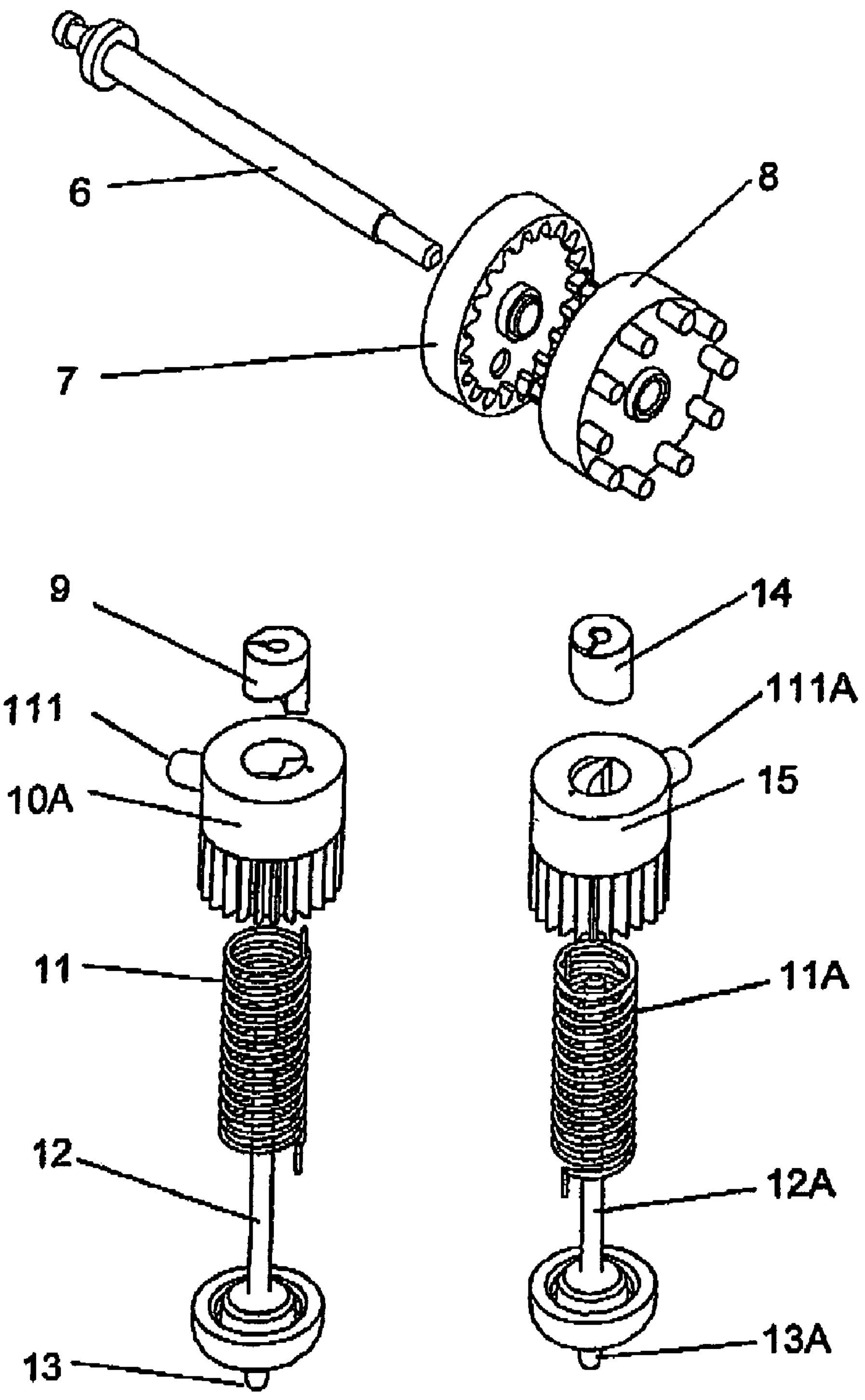
FIG. 7 shows an exploded, three-dimensional view of some parts of the embodiments shown in FIGS. 4 to 6.
Figure 8:
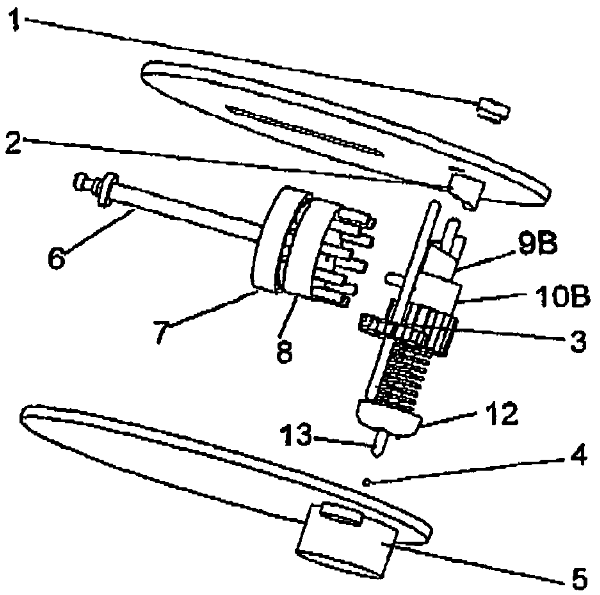
FIG. 8 shows an exploded three-dimensional view of an indexing mechanism according to a third embodiment of the present invention.
Figure 9:
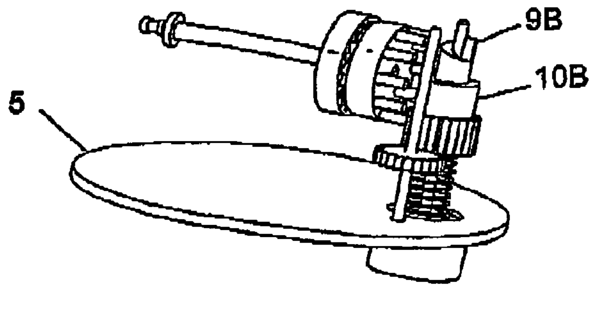
FIG. 9 shows a three-dimensional view of the indexing mechanism shown in FIG. 8 with the upper bearing plate removed.
Figure 10:
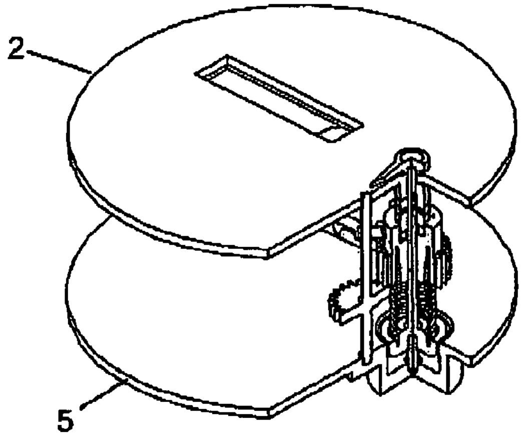
FIG. 10 shows a three-dimensional view of the indexing mechanism shown in FIGS. 8 and 9, partly cut-away.
Figure 11:
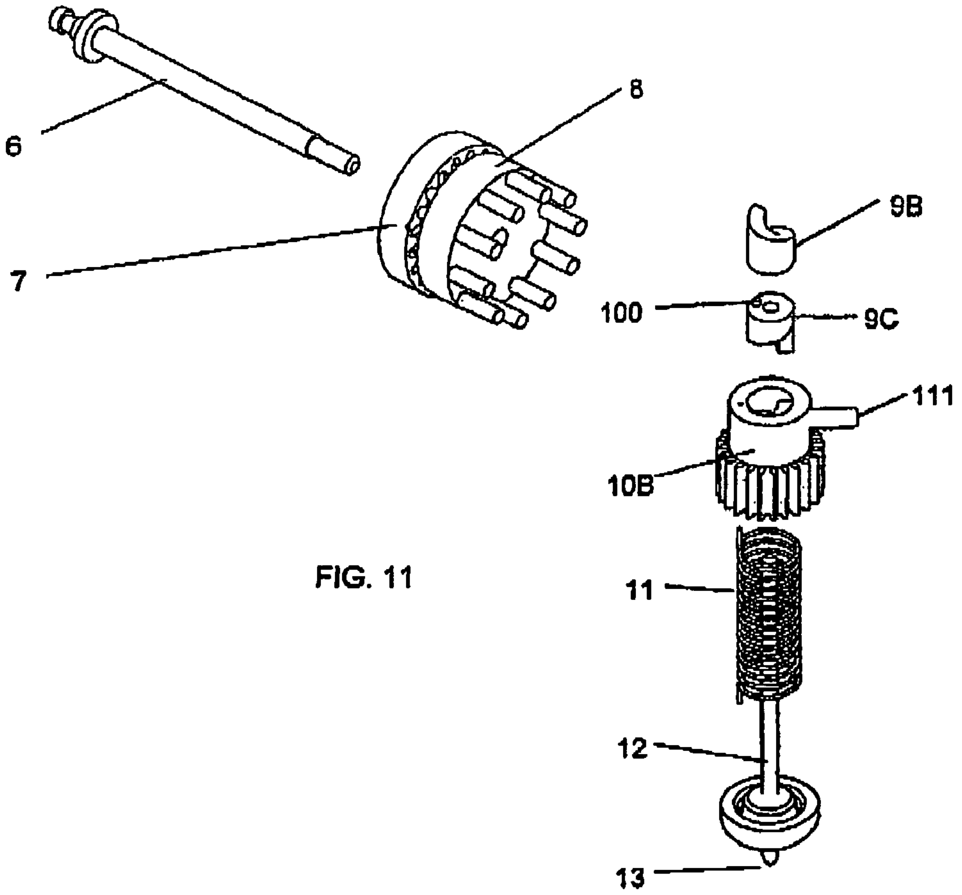
FIG. 11 shows an exploded, three-dimensional view of some parts of the indexing mechanism shown in FIGS. 8 to 10.
Figure 12:
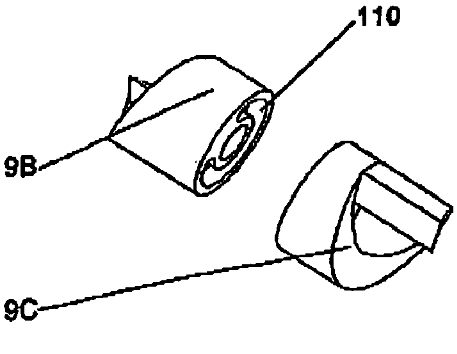
FIG. 12 shows an exploded, three-dimensional view of two cam bodies shown in FIG. 11.
Figure 13:
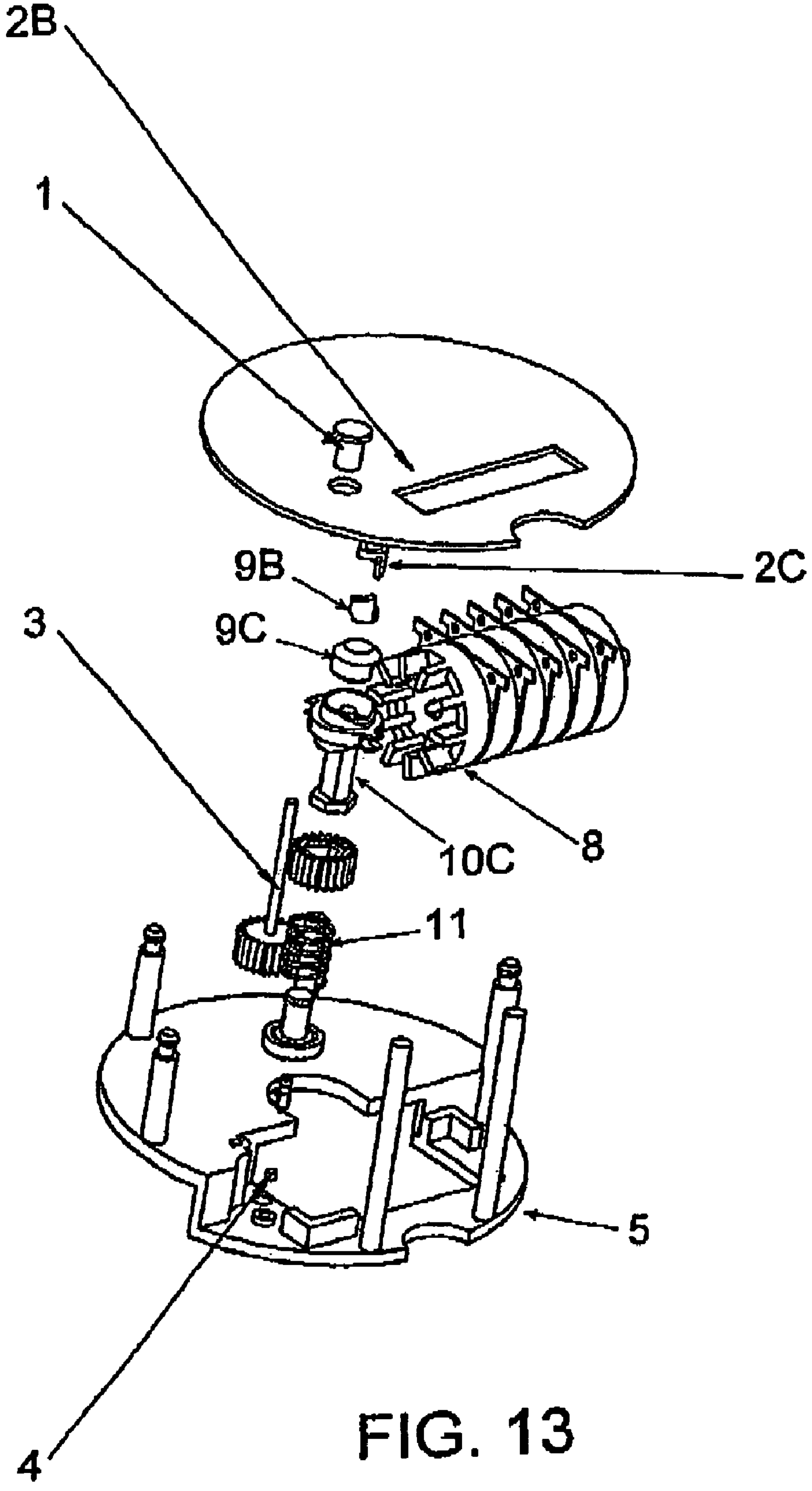
FIG. 13 shows an exploded, three-dimensional view of an indexing mechanism according to a fourth embodiment of the present invention.
Figure 14:
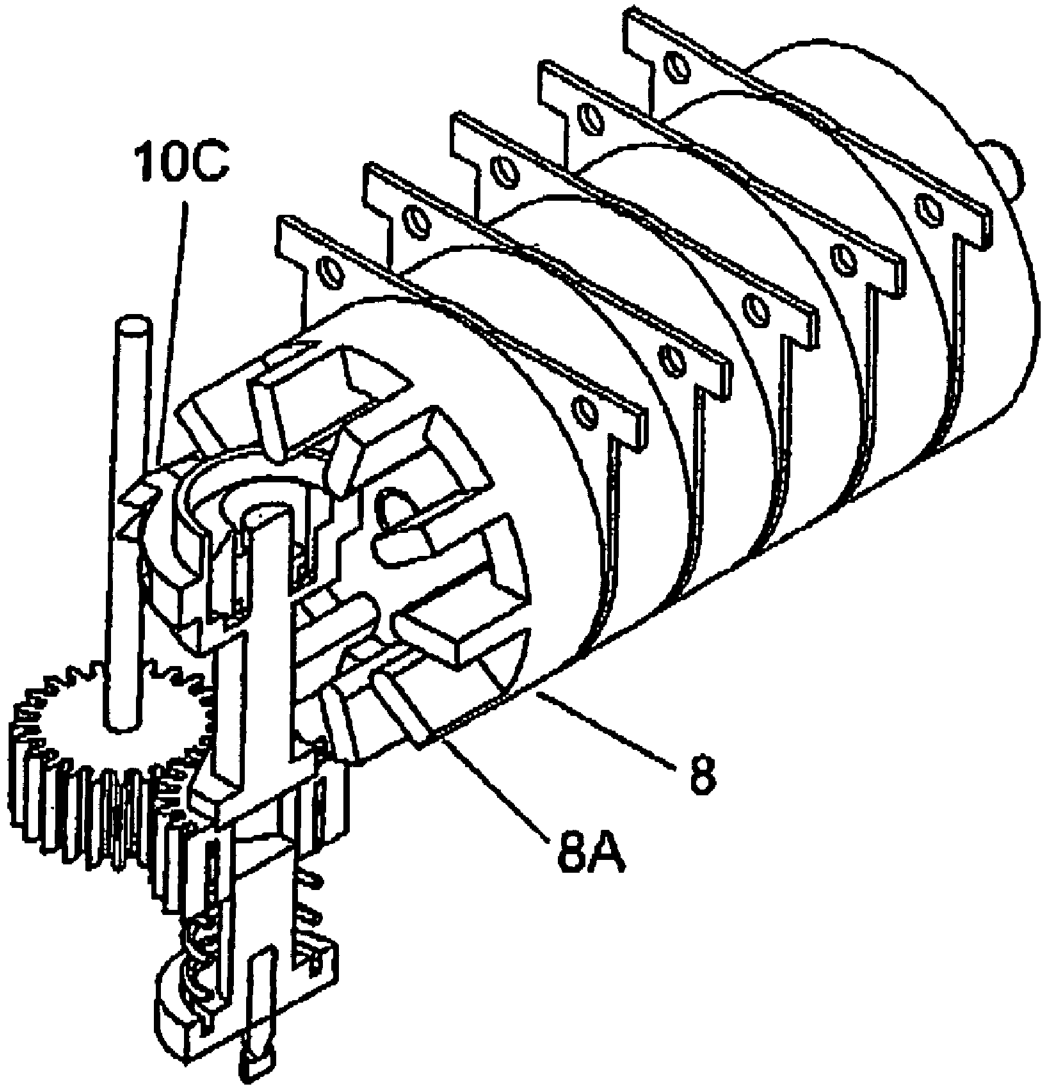
FIG. 14 shows a three-dimensional view of some parts of the embodiment shown in FIG. 13, partly cut-away.

Referring to FIGS. 1 to 3, a first embodiment of the present invention will be described The indexing mechanism of the first embodiment forms part of a water meter and comprises upper and lower bearing plates 2, 5, between which most of the remaining parts of the mechanism are located. A cup and spindle 12 is provided, which carries a first cam body 10 and a compressive spring 11 located between the cup and the first cam body. The cup further holds a bearing spindle insert 13, which is rotatably mounted in a bearing of the lower bearing plate 5. The bearing spindle insert 13 runs on a jewel 4. The upper end of the spindle further carries a second cam body 9 and is received within upper bearing plate 2. In the embodiment shown in the drawings the spindle 12 penetrates the upper bearing plate 2. On the upper side of the upper bearing plate the spindle 12 carries a pointer, which rotates with the spindle 12. As can best be seen in FIG. 1, upper bearing plate 2 is integrally formed with a cam, thus constituting a third cam body.

The indexing mechanism further comprises a drive roller 8, driving a roller 7 on which numbers may be marked to indicate a count. Further rollers may be provided on roller bank spindle 6 so as to indicate several digits of a count. Formed onto drive roller 8 are a plurality of pegs 8A via which the drive roller 8 can be driven. A helicoidal cam is formed onto the outer surface of the first cam body 10. This helicoidal cam engages with pegs 8A so as to drive the drive roller 8. The first cam body 10 can be rotated by means of drive gear 3, which has teeth engaging with teeth formed on the first cam body 10. Cam body 10 can be displaced axially on spindle 12. The first cam body 10 is biassed by compressive spring 11, which is located coaxial with the first cam body 10, towards a rest position, away from the lower bearing plate 5. The first cam body is further formed with an internal helicoidal cam (best seen in FIG. 3), which conforms with a cam on that surface of the second cam body 9 which faces the first cam body 10. On the other side of the second cam body 9 there is provided a further helicoidal cam, conforming with a cam on the lower side of the upper bearing plate 2 (the third cam body). The pitch of the cam formed by opposing surfaces of the second and third cam body 9 and 2 is much smaller than the pitch of the cam formed by opposing surfaces of the first and second cam body 10 and 9, which in turn corresponds to the pitch of the external cam of the first cam body 10 and also the distance between two pegs 8A of drive roller 8. The sense of the helicoidal cam formed between the second and third cam bodies 9 and 2 is opposite that of the cam formed between the first and second cam bodies 10 and 9 and the external cam on the first cam body 10.

During operation in a forward direction, the first cam body 10 is rotated in a first direction by means of drive gear 3. As the first cam body is rotated, the cam formed between the first and second cam bodies 10, 9 displaces the first cam body 10 axially towards the lower bearing plate 5. However, as the pitch of the external cam on the first cam body 10 is the same as that of the cam formed between the first and second cam bodies 10, 9, the external cam remains stationary relative to the drive roller pegs 8A, and thus does not drive them. When a full rotation of the first cam body is completed the helicoidal cam surfaces formed between the first and second cam bodies 10, 9 reach the end of engagement and the first cam body 10 is forced back up to the rest position without rotation with a rapid snap movement by the compressive spring 11. During this rapid movement the external cam on cam body 10 engages and drives one of the roller pegs 8A upwards, thereby incrementing the roller 7 by one index with a rapid snap movement. During rotation of the spindle 12 the pointer 1 also rotates.

In reverse operation, the first cam body 10 is rotated in a second (opposite) direction by means of drive gear 3. During this movement the opposing cam surfaces formed between the first and second cam bodies 10, 9 remain engaged. On the other hand, the cam formed between the second and third cam bodies 9, 2 displaces the first and second cam bodies 10, 9 slightly towards the lower bearing plate 5 until, upon completion of a full rotation, the end of engagement is reached at this cam and the first cam bodies 10, 9 are forced back towards the rest position by spring 11. As the pitch of the cam formed between the second and third cam bodies 9, 2 is insignificant, the first cam body 10 is not displaced by a large amount. During this rotational movement of the first cam body 10 in the second direction the external cam on the first cam body 10 drives a drive roller peg 8A downward in a continuous movement. A rapid snap movement as during forward operation does not take place. It will thus be seen that this embodiment enables the first cam body 10 to be rotated in both directions, and the indexing mechanism counts in both directions.

A second embodiment will now be described with reference to FIGS. 4 to 7, in which like details carry like reference symbols as in FIGS. 1 to 3. As in the first embodiment, the indexing mechanism comprises an upper and lower bearing plate 2A and 5A, a roller bank spindle 6, a roller 7, a drive roller 8 carrying a plurality of drive roller pegs 8A and a drive gear 3. A cup and spindle 12 carrying a compressive spring 11, first and second cam bodies 10A and 9 and a bearing spindle 13 is also provided, and a jewel 4 facilitating rotation with respect to the lower bearing plate 5A. The upper bearing plate 2A is again formed with a helicoidal cam surface of insignificant pitch on its lower side. The configuration and function of the above parts of the second embodiment are the same as in the first embodiment, except that instead of being formed with an external helicoidal cam, the first cam body 10A is formed with a peg 111 for engaging the pegs 8A of drive roller 8.

The second embodiment is provided with a further cup and spindle 12A, bearing spindle 13A, compressive spring 11A, first and second cam bodies 15 and 14 and jewel 4. The further cup and spindle 12A is arranged in parallel next to cup and spindle 12. Upper bearing plate 2A is formed with a further helicoidal cam surface thereby constituting a further third cam body. The further first, second and third cam bodies are mirror-images of the first, second and third cam bodies.

Forward operation of the second embodiment is the same as that of the first embodiment as regards the sub-assembly carried by spindle 12, except that, of course, no external helicoidal cam is provided on the first cam body 10A. During most of the axial displacement of the first cam body 10A the peg 111 is not engaged with pegs 8A. Only upon completion of a rotation of the first cam body 10A the peg 111, which then has reached a position between two adjacent pegs 8A moves upwards in a rapid snap movement, thereby driving the drive roller 8. During this rapid snap movement, the peg 111A carried by the further first cam body 15 is not in contact with any of the pegs 8A. During rotation of the first cam body 10A the further first cam body 15 also rotates, in the embodiment shown in the same direction, and peg 111A passes between two adjacent pegs 8A. The two opposing cam surfaces between the further first and second cam bodies 15, 14 are in contact and the further first and second cam bodies 15, 14 are displaced axially only slightly by means of the cam formed between the further second and third cam bodies 14, 2A.

When the mechanism is operated in reverse, the roles of the sub-assemblies carried by spindles 12 and 12A are reversed, which means that it is now the further first and second cam bodies which are axially displaced by the cam formed therebetween, and upon completion of a full rotation the further peg 111A drives the drive roller 8 by means of one of the pegs 8A. The opposing cam surfaces formed on first and second cam bodies 10A and 9 remain in contact during this reverse movement and are displaced axially only slightly by means of the small-pitched cam formed between the second and third cam bodies 9, 2A. Thus it can be seen that the second embodiment provides for rapid snap indexing movement of roller 7 in both directions.

A third embodiment of the present invention will now be described with reference to FIGS. 8 to 12, in which like parts carry like reference numerals as in FIGS. 1 to 7. The constitution of the third embodiment is basically the same as that of the first embodiment, except that the first, second and third cam bodies 10, 9 and 2 of the first embodiment are replaced by first to fourth cam bodies 10B, 9C, 9B and 2, The first cam body 10B of the third embodiment is the same as the first cam body 10A of the second embodiment, that is, it carries a peg 111 but no external helicoidal cam. The second cam body 9C has a lower helicoidal cam surface on its lower side like the second cam body 9 of the first embodiment. However, on its upper side no cam surface is provided. Instead, a pin 100 is provided in axial direction, which is received within a crescent-shaped groove 110 provided on the lower side of the third cam body 9B. A helicoidal cam surface is provided on the upper surface of the third cam body 9B, having the same pitch as the helicoidal cam surface formed on the lower surface of the second cam body 9C, but running in opposite direction. The upper bearing plate 2, forming the fourth cam body is provided with a helicoidal cam surface conforming with the helicoidal cam surface provided on the upper side of the third cam body 9B.

The second and third cam bodies 9C and 9B can be rotated with respect to each other. However, this movement is limited by movement of pin 100 within groove 110. During forward operation the first cam body 10B is rotated by drive gear 3 in a first direction. This drives the second cam body 9C until pin 100 arrives at a stop at one of the ends of groove 110 in the third cam body 10B. Once pin 100 has arrived at its stop in groove 110 it cannot move the third cam body 9 since the cam formed between the third and forth cam bodies 9B and 2 would not permit such movement. Instead, the first cam body 10B is displaced axially towards the lower bearing plate 5, due to the cam formed between the first and second cam bodies 10B and 9C. During this movement the peg 111 does not engage any of the pegs 8A. When a full rotation of the first cam body 10B with respect to the second cam body 9C has been completed the opposing cam surfaces formed therebetween reach the end of engagement, and the first cam body 10B returns to its rest position with a rapid snap movement. The peg 111 is formed at such a position on the first cam body 10B that, during this rapid snap movement, it engages one of the drive pegs 8A to drive the drive roller 8 and the roller 7.

If the sense of rotation of the drive gear 3 is reversed at this stage the first and second cam bodies 10B and 9C remain engaged and the second cam body 9C is rotated with respect to the third cam body 9B. Again, this movement is limited by the length of groove 110, and when pin 100 has reached a stop at the other end of groove 110 it starts moving the third cam body 9B with respect to the forth cam body 2. The cam formed between the third and forth cam bodies 9B and 2 causes the first to third cam bodies 10B, 9C and 9B to be displaced axially towards the lower bearing plate 5 until the cam surfaces between the third and forth cam bodies 9B and 2 reach the end of their engagement. During this movement the peg 111 does not engage any of the drive roller pegs 8A. Only upon completion of a full rotation the first to third cam bodies 10B, 9C and 9B return to their rest positions with a rapid snap movement, and peg 111 drives a drive roller peg 8A with a rapid snap indexing movement.

Whilst during forward operation the peg 111 engages a drive roller peg 8A on one side of the drive roller 8 so as to drive the drive roller 8 in a first sense, during reverse operation after rotational movement of the second cam body 9C with respect to the third cam body 9B defined by the appropriately chosen length of groove 110 the peg 111 has arrived on the other side of drive roller 8 for driving a peg 8A on that other side as to drive the drive roller 8 in the opposite sense.

It can thus be seen be seen that this embodiment enables rapid snap indexing movement of the drive roller 8 in both directions without requiring two sub-assemblies carried by two spindles as in the second embodiment.

A fourth embodiment is illustrated in FIGS. 13 to 22, in which like parts carry like reference numerals as in FIGS. 1 to 12. The fourth embodiment is essentially a refinement of the third embodiment.

The main difference between the third and fourth embodiments lies in the shape of the first cam body, 10C in the fourth embodiment. As can best be seen in FIG. 14, the first cam body 10C is at least partially received within the space defined between pegs 8A on drive roller 8, which pegs are, in order to improve mechanical stability and durability, formed with an oblong cross section. Generally speaking the first cam body 10C is formed such that it prevents the drive roller 8 from rotating except when the drive roller 8 is being driven by the rapid snap movement of the first cam body 10C. There is hence no danger of drive roller 8 being pivoted or rotated accidentally, e.g. due to sudden movements of the indexing mechanism, tampering or other external influences.

Figure 17:
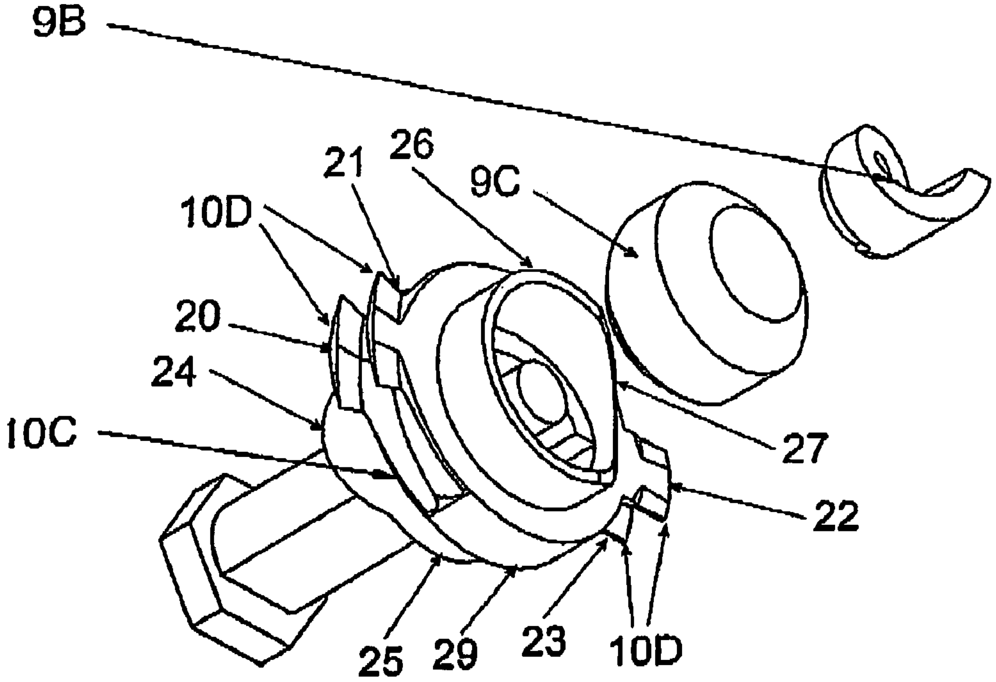

As part of the particular shape of the first cam body 10C which prevents accidental movement of drive roller 8 the first cam body is formed with two pairs of blades 10D (best seen in FIG. 17). Depending on the rotational position of the first cam body 10C the blades 10D perform the function of driving the drive roller 8 via pegs 8A or of preventing the drive roller 8 from rotating. During rotation of the first cam body 10C and axial movement thereof different portions of the first cam body 10C take over the function of preventing the drive roller 8 from rotating.

Figure 15:
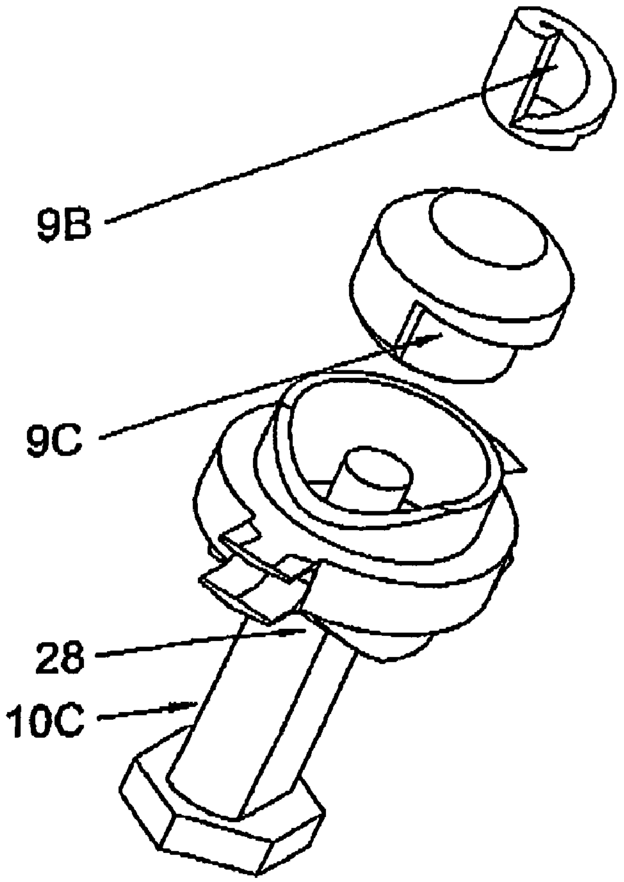
FIGS. 15 to 22 show exploded, three-dimensional views of three cam bodies shown in FIG. 13.
Figure 16:
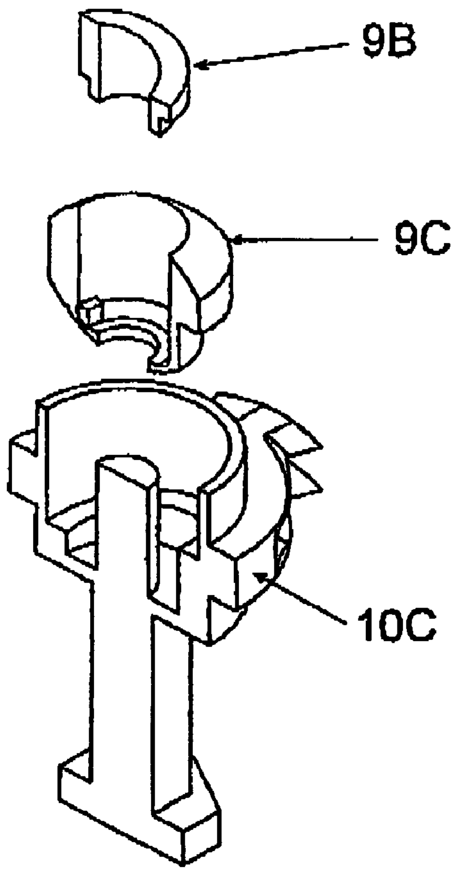
Figure 18:
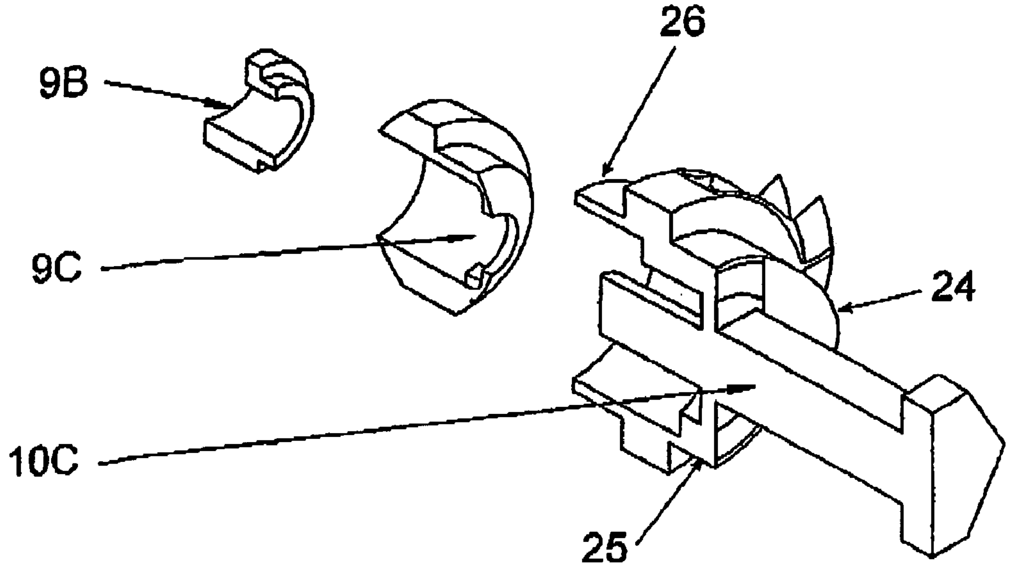
Figure 19:
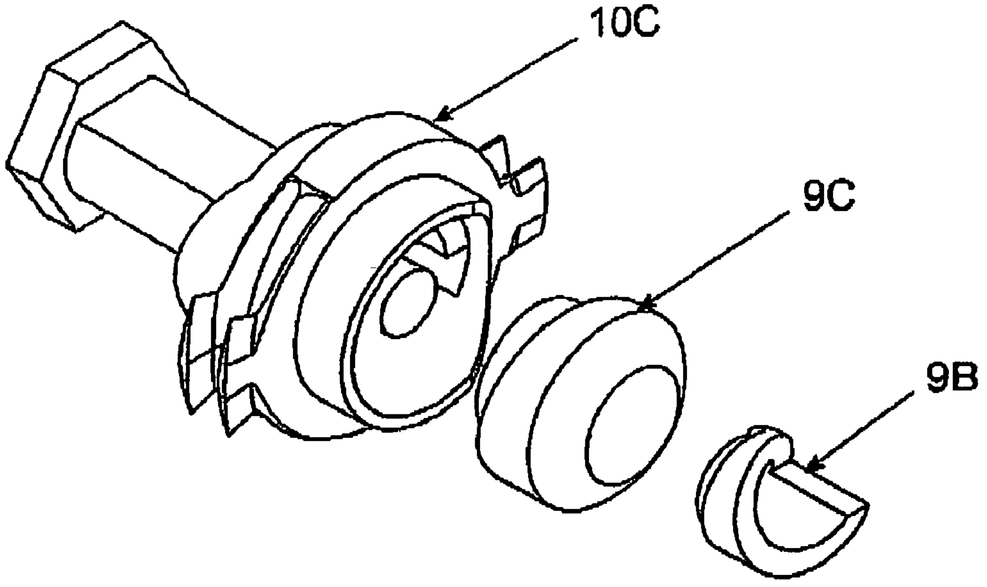
Figure 20:
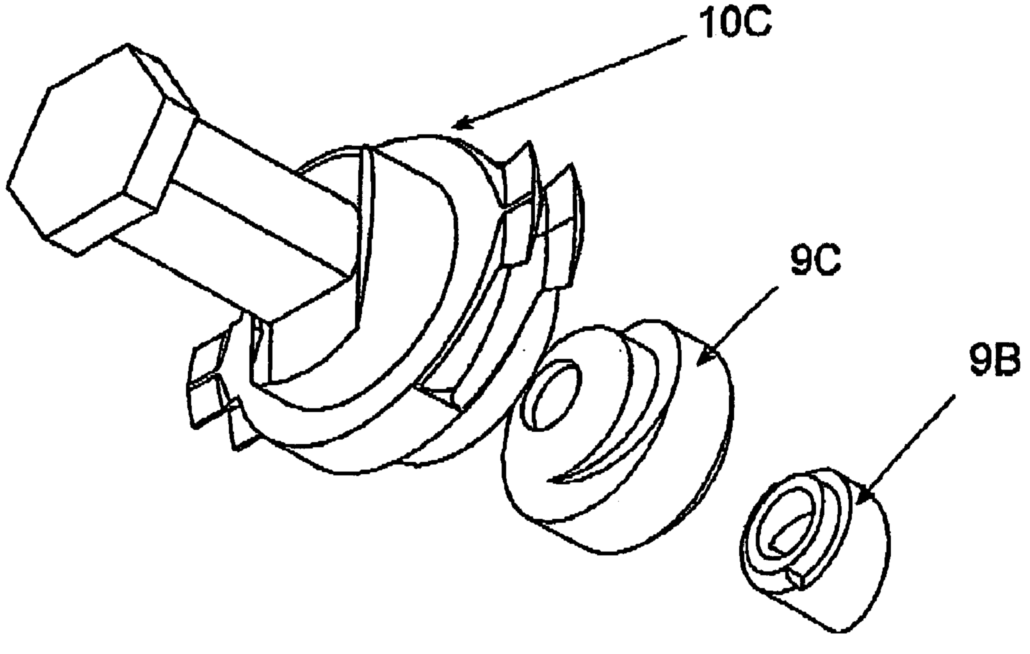
Figure 21:
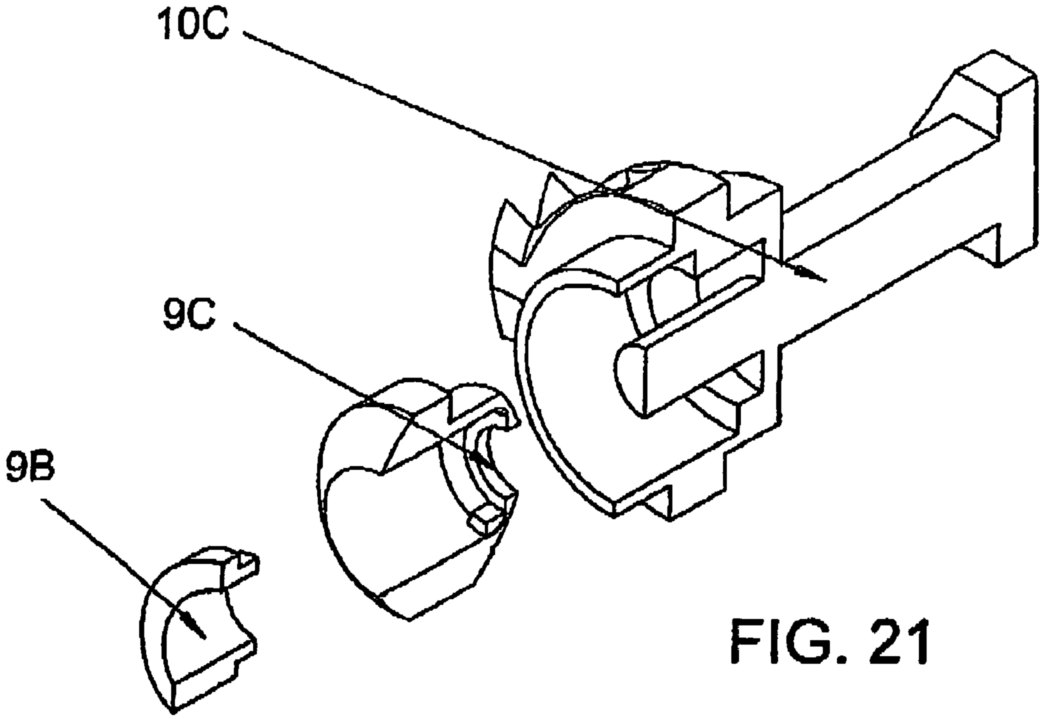
Figure 22:
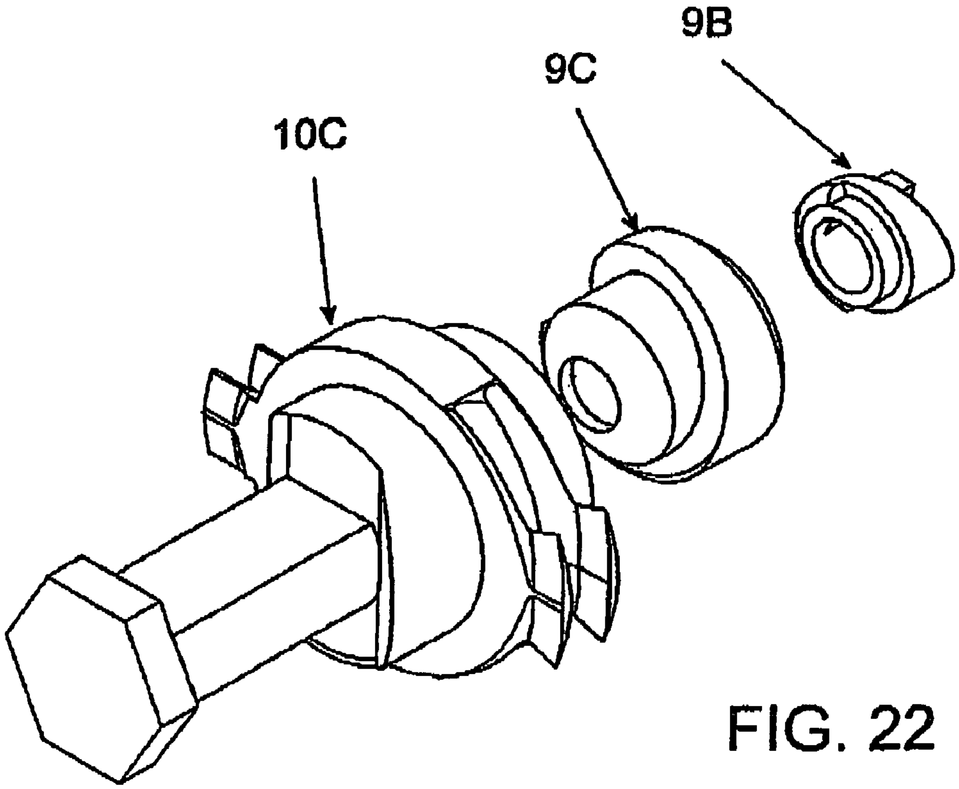

The first cam body 10C of the embodiment illustrated in FIGS. 13-22 is in particular formed with a generally cylindrical central portion 29 between two generally cylindric portions 25 and 26 of slightly smaller diameter (FIGS. 15, 17 and 18). The blades 10D are carried by the central cylindrical portion 29. Cylindrical portion 25 is formed with one axially protruding lip 24 and a cut-out portion 28 situated diametrically opposite the axial lip 24. Similarly, the cylindrical portion 26 has a cut-out portion 27 at the same angular position at the cut-out portion 28. The blades 10D are not all identical. Blades 20 and 21, which are situated at the same angular position as the axial lip 24 are longer in the circumferential direction than blades 22 and 23, which are located at the same angular position as cut-out portions 27 and 28.

The spacing in the axial direction between blades 20 and 21 on the one hand and blades 22 and 23 on the other corresponds to the thickness of the pegs 8A, so as to enable a said peg 8A to pass between these blades during rotation of the first cam body 10C. Similarly the overall axial extent of the pair of blades 20 and 21 and the pair of blades 22 and 23 corresponds to the spacing between two adjacent pegs 8A so as to enable the pairs of blades to pass between two adjacent pegs 8A during another part of the rotation of the first cam body 10C.

During almost the entire rotation of the first cam body 10C the drive roller 8 is prevented from rotating since, depending on the rotational position of the first cam body 10C, different ones of the pegs 8A are restricted in their movement. This movement is in particular restricted by the steps formed by the three cylindrical portions 25, 26 and 29, the axial lip 24 and blades 20, 21,22 and 23. Similarly, the cut-out portions 27 and 28 ensure that the first cam body 10C can rotate and move axially without being restricted by the drive roller 8 or pegs 8A. It can thus be-seen that the particular shape of the first cam body 10C ensures that the index mechanism does not jam, whilst preventing the drive roller 8 from rotating except when it is being indexed by the first cam body 10C being restored to its axial rest position.

As a fifth embodiment (a modification of the fourth embodiment), it is possible to assemble the indexing mechanism such that the axis carrying the first cam body 10C does not pass through the axis about which the drive roller 8 rotates, but is offset relative thereto. To this end the cam body axis is located approximately on a tangent to the pitch circle of the centres of the pegs 8A. With this arrangement the first cam body 10C only drives the pegs 8A on one side of the drive roller 8, irrespective of the direction of rotation of the first cam body. As a result the drive roller 8 is driven only in one sense, irrespective of the rotational direction of drive gear 3. This can be particularly useful if the indexing mechanism is used in an electricity, gas or water meter since fraudulent attempts to reverse the counter by e.g. reversing electrical contacts for rotating the drive gear 3 would fail.

The first embodiment can be modified to form a sixth embodiment. To this end the external helicoidal cam carried by the first cam body 10 is replaced by two, three or even four helicoidal cams angularly distributed about the perimeter of the first cam body 10. The cam formed between the first and second cam bodies 10, 9 would have to be formed correspondingly. More than about 4 cams should, however, not be formed since this would result in too much friction between the first and second cam bodies 10, 9 (as is the case in a ratchet).

In an arrangement with n helicoidal cams arranged on the first cam body 10, upon one full rotation of the first cam body the roller 7 is driven not only through one number interval but through n number intervals. Corresponding modifications are possible with Embodiments 2 and 3, with two or more pegs 111 or 111A distributed about the perimeter of the first cam body.

All of the above embodiments can be modified to form a seventh embodiment. In the seventh embodiment no roller bank and drive roller 8 are required. Further, the first cam body does not require an engagement formation as it is not used to drive a drive gear mechanically. In the seventh embodiment the rapid snap movement of the first cam body is not "detected" mechanically by a drive roller, but electrically, for example by means of a reed switch. Processing circuitry may be provided which ensures that the reed switch only detects the rapid snap movement of the first cam body when the first cam body is being restored to its axial rest position, but not the axial displacement away from its rest position.

It will be appreciated that the rapid snap movement of the first cam body can also be detected by other means, e.g. optically.

It will also be appreciated that, whilst it is preferred to use a compressive spring for restoring the first cam body to its axial rest position, other forms of springs such as a tension spring may also be used.

While the present invention has been described in its preferred embodiments, it is to be understood that the words which have been used are words of description rather than limitation and that changes may be made to the invention without departing from its scope as defined by the appended claims.

Each feature-disclosed in this specification (which term includes the claims) and/or shown in the drawings may be incorporated in the invention independently of other disclosed and/or illustrated features.

Reference numerals used in the claims are for illustration purposes only, and are not to be understood in a limiting sense.

The invention claimed is:

1. An indexing mechanism comprising:

a body (10, 10A, 10B, 10C) mounted so as to be rotatable about an axis;

a drive (3) for rotating said body about said axis;

a first cam (9, 9C, 10, 10A, 10B, 10C) for displacing said body along said axis away from an axial rest position of said body during rotation of said body in a first direction;

a biasing device (11) for restoring the body to the axial rest position on completion of a rotation or a predetermined portion thereof of the body;

a detector for detecting the axial movement of the body when the body is being restored to the axial rest position, and for effecting indexing in response to said axial movement; and a second cam (2, 9, 2A, 9B, 2C) permitting said body to be rotated in a second direction opposite the first direction.

2. An indexing mechanism according to claim 1, wherein the second cam is arranged to displace said body along said axis away from the axial rest position during rotation of said body in the second direction.

3. An indexing mechanism according to claim 1, wherein the biasing device (11) comprises a spring, preferably a compressive spring, located co-axially with said body.

4. An indexing mechanism according to claim 1, wherein the second cam (2, 9, 2A) displaces said body axially to a lesser extent than the first cam (9, 10, 10A).

5. An indexing mechanism according to claim 1, wherein the second cam (2, 9B) displaces said body axially to the same extent as the first cam (10B, 9C).

6. An indexing mechanism according to claim 1, wherein the or each cam comprises a pair of conforming cam surfaces.

7. An indexing mechanism according to claim 1, wherein the or each cam comprises at least one helicoidal cam surface (10).

8. A meter or other counting device comprising an indexing mechanism as claimed in claim 1.

9. An indexing mechanism comprising:

a body (10, 10A, 10B, 10C) mounted so as to be rotatable about an axis;

a drive (3) for rotating said body about said axis;

a first cam (9, 9C, 10, 10A, 10B, 10C) for displacing said body along said axis away from an axial rest position of said body during rotation of said body in a first direction;

a spring (11), preferably a compressive spring, located coaxially with said body and for restoring the body to the axial rest position on completion of a rotation or a predetermined portion thereof of the body;

a detector for detecting the axial movement of the body when the body is being restored to the axial rest position, and for effecting indexing in response to said axial movement; and a device (2, 9, 2A, 9B, 2C) for permitting said body to be rotated in a second direction opposite the first direction.

10. An indexing mechanism according to claim 9, wherein the permitting device (2, 9, 2A) permits said body to be rotated in the second direction substantially without axial movement thereof.

11. An indexing mechanism according to claim 9, wherein the permitting device comprises a second cam.

12. An indexing mechanism comprising:

a body (10, 10A, 10B, 10C) mounted so as to be rotatable about an axis;

a drive (3) for rotating said body about said axis;

a first cam (9, 9C, 10, 10A, 10B, 10C) for displacing said body along said axis away from an axial rest position of said body during rotation of said body in a first direction;

a biasing device (11) for restoring the body to the axial rest position on completion of a rotation or a predetermined portion thereof of the body;

a detector for detecting the axial movement of the body when the body is being restored to the axial rest position, the detector comprising at least one wheel (8) which is indicative of a count;

a plurality of first engagement formations (8A) connected to the wheel (8) and in angularly spaced relationship with each other, wherein the wheel (8) can be driven via the first engagement formations (8A);

wherein said body (10, 10A, 10B, 10C) has at least one second engagement formation (10, 10D, 111), for engaging and driving the first engagement formations (8A);

wherein the first cam (9, 9C, 10, 10A, 10B, 10C) is arranged to displace said body along said axis away from the axial rest position is synchronism with rotation thereof in the first direction, such that the first engagement formations(8A) are not driven by the at least one second engagement formation (10, 111) over a substantial portion of a rotation of said body about said axis in the first direction; and wherein, when said body is being restored to the axial rest position, the at least one second engagement formation (10, 10D, 111) drives the plurality of first engagement formations (8A) so as to index the wheel (8) incrementally in a first sense.

13. An indexing mechanism according to claim 12, wherein a said body (10, 10C) is formed such that the plurality of first engagement formations is prevented from rotating except when the body is being driven by the at least one second engagement formation.

14. An indexing mechanism according to claim 12, wherein the first cam body 10C is shaped such that, during the rotation and axial movement of the first cam body, different portions thereof prevent the plurality of first engagement formations (8A) from rotating.

15. An indexing mechanism according to claim 12, wherein the at least one second engagement formation comprises a protrusion or a plurality of axially spaced protrusions having an overall extent in the axial direction corresponding to the distance between two adjacent first engagement formations.

16. An indexing mechanism according to claim 12, wherein the at least one second engagement formation comprises a pair of axially spaced protrusions, the axial spacing between the protrusions corresponding to the thickness of a said first engagement formation.

17. An indexing mechanism according to claim 12, wherein said pair of protrusions have an overall extent in the axial direction corresponding to the distance between two adjacent first engagement formations.

18. An indexing mechanism according to claim 12, wherein the indexing mechanism further comprises at least one third engagement formation (111A) mounted so as to be rotatable about a further axis;

a further drive (3, 15) for rotating the at least one third engagement formation (111A) about the further axis; and a further cam (15, 14) for displacing the at least one third engagement formation (111A) along the further axis away from a further axial rest position in synchronism with rotation thereof in a third direction such that the first engagement formations (8A) remain stationary over a substantial portion of a rotation of the at least one third engagement formation (111A) about the further axis in the third direction;

a further biasing device (11A) for restoring the at least one third engagement formation (111A) to the further axial rest position to drive the plurality of first engagement formations (8A) so as to index the wheel (8) incrementally in a second sense opposite the first sense; and a further device (2A, 14) permitting the at least one third engagement formation (111A) to be rotated in a fourth direction opposite the third direction.

19. An indexing mechanism according to claim 18, wherein the drive and the further drive comprises respective first (10A) and second (15) gears provided with teeth that extend a sufficient distance along said axis and the further axis, to remain continuously in contact with teeth of one and the same drive gear (3).

20. An indexing mechanism according to claim 19, wherein the further permitting device comprises a second further cam.

21. An indexing mechanism according to claim 18, wherein the further biasing device comprises a further spring, preferably a compressive spring.

22. An indexing mechanism according to claim 12, comprising a second cam (2, 9, 2A, 9B, 2C) permitting said body to be rotated in a second direction opposite the first direction.

23. An indexing mechanism according to claim 22 wherein the first cam and the second cam are formed by at least three cam bodies (2, 9, 10, 2A, 1A), said body constituting a first said cam body, the at least one second engagement formation being mounted on said first cam body (10, 10A), wherein the first cam (9, 10, 10A) limits rotational movement of the first cam body (10, 10A) with respect to the second cam body (9) in the second direction, and wherein the second cam (2, 9, 2A) limits rotational movement of the second cam body (9) with respect to the third cam body (2, 2A) in the first direction.

24. An indexing mechanism according to claim 22, wherein the first cam and the second cam are formed by four cam bodies (2, 2C, 9B, 9C, 10B, 10C), said body constituting a first said cam body, the at least one second engagement formation (111, 10D) being mounted on said first cam body (10B, 10C), wherein the first cam (10B, 10C, 9C) limits rotational movement of the first cam body (10B, 10C) with respect to the second cam body (9C) in the second direction, and the second cam (2, 9B) limits rotational movement of the third cam body (9B) with respect to the fourth cam body (2, 2C) in the first direction, wherein there is further provided device (100, 110) for limiting rotational movement of the second cam body (9C) with respect to the third cam body (9B) in either direction.

25. An indexing mechanism according to claim 24, wherein the rotation-limiting device (100, 110) permits rotational movement of the second cam body (9C) with respect to the third cam body (9B) without axial movement of said body.

26. An indexing mechanism according to claim 25, wherein the rotation limiting device (100, 110) limits rotational movement of the second cam body (9C) with respect to the third cam body (9B) such as to permit movement of the at least one second engagement formation (111, 10D) from a first position for driving the wheel (8) in the first sense to a second position for driving the wheel (8) in a second sense opposite the first sense.

27. An indexing mechanism according to claim 24, wherein the rotation limiting device (100, 110) limits rotational movement of the second cam body (9C) with respect to the third cam body (9B) such as to permit movement of the at least one second engagement formation (111, 10D) from a first position for driving the wheel (8) in the first sense to a second position for driving the wheel (8) in a second sense opposite the first sense.

28. An indexing mechanism according to claim 22, wherein the at least one second engagement formation drives the wheel in the first sense regardless of whether said body is rotated in the first direction or the second direction.

* * * * *